(12) United States Patent
Yan et al.

(10) Patent No.: US 10,553,026 B2
(45) Date of Patent: Feb. 4, 2020

(54) DENSE VISUAL SLAM WITH PROBABILISTIC SURFEL MAP

(71) Applicant: Robert Bosch GmbH, Stuttgart (DE)

(72) Inventors: Zhixin Yan, Sunnyvale, CA (US); Mao Ye, San Jose, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/036,979

(22) Filed: Jul. 17, 2018

(65) Prior Publication Data

US 2019/0026943 A1 Jan. 24, 2019

Related U.S. Application Data

(60) Provisional application No. 62/535,038, filed on Jul. 20, 2017.

(51) Int. Cl.
| | |
|---|---|
| *G06T 17/20* | (2006.01) |
| *G06T 7/586* | (2017.01) |
| *G06T 7/579* | (2017.01) |
| *G06T 7/33* | (2017.01) |
| *G06T 7/70* | (2017.01) |

(52) U.S. Cl.
CPC ............ *G06T 17/205* (2013.01); *G06T 7/344* (2017.01); *G06T 7/579* (2017.01); *G06T 7/586* (2017.01); *G06T 7/70* (2017.01); *G06T 2200/08* (2013.01); *G06T 2207/10028* (2013.01); *G06T 2207/30244* (2013.01)

(58) Field of Classification Search
CPC .................................................... G06T 17/205

USPC .......................................................... 345/419
See application file for complete search history.

(56) References Cited

PUBLICATIONS (Jörg Stückler and Sven Behnke. 2014. Multi-resolution surfel maps for efficient dense 3D modeling and tracking. J. Vis. Comun. Image Represent. 25, 1 (Jan. 2014) (Year: 2014).*
Lin, Bingxiong, "Visual SLAM and Surface Reconstruction for Abdominal Minimally Invasive Surgery" (2015). Graduate Theses and Dissertations. (Year: 2015).*
Gauglitz, S. et al., "Live Tracking and Mapping from Both General and Rotation-Only Camera Motion," IEEE International Symposium on Mixed and Augmented Reality, pp. 13-22, 2012 (10 pages).
Kähler, O. et al., "Real-Time Large-Scale Dense 3D Reconstruction with Loop Closure," ECCV 2016, Part VIII, LNCS 9912, pp. 500-516, 2016 (17 pages).

(Continued)

*Primary Examiner* — Shivang I Patel
(74) *Attorney, Agent, or Firm* — Maginot, Moore & Beck LLP (57) ABSTRACT

A novel map representation called Probabilistic Surfel Map (PSM) for dense visual SLAM is disclosed. The PSM maintains a globally consistent map with both photometric and geometric uncertainties encoded in order to address inconsistency and sensor noise. A key aspect of the visual SLAM method disclosed herein is the proper modeling and updating of the photometric and geometric uncertainties encoded in the PSM. Strategies for applying the PSM for improving both the front-end pose estimation and the back-end optimization are disclosed. Moreover, the PSM enables generation of a high quality dense point cloud with high accuracy.

18 Claims, 7 Drawing Sheets

(56) References Cited

PUBLICATIONS

Schöps, T. et al., "Semi-Dense Visual Odometry for AR on a Smartphone," IEEE International Symposium on Mixed and Augmented Reality, pp. 145-150, 2014 (6 pages).

Vistér, D. et al., "Visual Odometry," Proceedings of the 2004 IEEE Computer Society Conference on Computer Vision and Pattern Recognition (CVPR'04), 2004 (8 pages).

Babu, B. W. et al., "σ-DVO: Sensor Noise Model Meets Dense Visual Odometry," In Mixed and Augmented Reality (ISMAR), 2016 IEEE International Symposium on, IEEE, 2016 (9 pages).

Kerl, C. et al., "Dense Visual SLAM for RGB-D Cameras," In Proc. of the Int. Conf. on Intelligent Robot Systems (IROS), 2013 (7 pages).

Kerl, C. et al., "Robust Odometry Estimation for RGB-D Cameras," In Int. Conf. on Robotics and Automation, 2013 (8 pages).

Kümmerle, R. et al., "G2O: A General Framework for Graph Optimization," In Robotics and Automation (ICRA), 2011 IEEE International Conference on, 2011 (7 pages).

Baker, S. et al., "Lucas-Kanade 20 Years on: A Unifying Framework," International Journal of Computer Vision 56 (3), 221-255, 2004 (35 pages).

Dai, A. et al., "BundleFusion: Real-time Globally Consistent 3D Reconstruction using On-the-fly Surface Re-integration," 2017, accessed and retrieved Jul. 16, 2018 from internet: https://arxiv.org/abs/1604.01093 (19 pages).

Endres, F. et al., "An Evaluation of the RGB-D SLAM System," in Proceedings of IEEE International Conference on Robotics and Automation, 2012 (6 pages).

Engel, J. et al., "Direct Sparse Odometry," in IEEE Transactions on Pattern Analysis and Machine Intelligence, 2017 (14 pages).

Engel, J. et al., "LSD-SLAM: Large-Scale Direct Monocular SLAM," In European Conference on Computer Vision, 2014 (16 pages).

Forster, C. et al., "SVO: Fast Semi-Direct Monocular Visual Odometry," In IEEE International Conference on Robotics and Automation (ICRA), 2014 (8 pages).

Handa, A. et al., "A Benchmark for RGB-D Visual Odometry, 3D Reconstruction and SLAM," In IEEE International Conference on Robotics and Automation, ICRA, 2014 (8 pages).

Keller, M. et al., "Real-time 3D Reconstruction in Dynamic Scenes using Point-based Fusion," 2013 International Conference on 3D Vision—3DV, 2013 (8 pages).

Klein, G. et al., "Parallel Tracking and Mapping for Small AR Workspaces," 2007 6th IEEE and ACM International Symposium on Mixed and Augmented Reality, 2007 (10 pages).

Konolige, K. et al., "Outdoor Mapping and Navigation using Stereo Vision," in Experimental Robotics, 2008 (12 pages).

Leonard, J. J. et al., "Simultaneous Map Building and Localization for an Autonomous Mobile Robot," IEEE International Workshop on Intelligent Robots and Systems, IROS '91, 1991 (6 pages).

Liu, H. et al., "Robust Keyframe-based Monocular SLAM for Augmented Reality," 2016 IEEE International Symposium on Mixed and Augmented Reality, 2016 (10 pages).

Mur-Artal, R. et al., "ORB-SLAM: a Versatile and Accurate Monocular SLAM System," IEEE Transactions on Robotics, vol. 31, Issue 5, 2015 (17 pages).

Newcombe, R. A. et al., "Live Dense Reconstruction with a Single Moving Camera," In Computer Vision and Pattern Recognition (CVPR), 2010 (8 pages).

Newcombe, R. A., et al., "KinectFusion: Real-Time Dense Surface Mapping and Tracking," in IEEE International Symposium on Mixed and Augmented Reality, 2011 (10 pages).

Newcombe, R. A. et al., "DTAM: Dense Tracking and Mapping in Real-Time," in IEEE International Conference on Computer Vision, 2011 (8 pages).

Pradeep, V. et al., "MonoFusion: Real-time 3D Reconstruction of Small Scenes with a Single Web Camera," in IEEE International Symposium on Mixed and Augmented Reality (ISMAR), 2013 (6 pages).

Strasdat, H. et al., "Double Window Optimisation for Constant Time Visual SLAM," in 2011 International Conference on Computer Vision, 2011 (8 pages).

Stückler, J. et al., "Multi-Resolution Surfel Maps for Efficient Dense 3D Modeling and Tracking," Journal of Communication and Image Representation, vol. 25, Issue 1, 2014 (30 pages).

Sturm, J. et al., "A Benchmark for the Evaluation of RGB-D SLAM Systems," in IEEE International Conference on Intelligent Robots and Systems (IROS), 2012 (8 pages).

Sturm, P. et al. ,"A Factorization Based Algorithm for Multi-Image Projective Structure and Motion," in 4th European Conference on Computer Vision, 1996 (10 pages).

Tykkälä, T. et al., "Direct Iterative Closest Point for Real-time Visual Odometry," 2011 International Conference on Computer Vision Workshops (ICCV Workshops), 2011 (7 pages).

Whelan, T. et al., "Kintinuous: Spatially Extended KinectFusion," Computer Science and Artificial Intelligence Laboratory, Technical Report, Massachusetts Institute of Technology, 2012 (9 pages).

Whelan, T. et al., "Real-time large scale dense RGB-D SLAM with volumetric fusion," International Journal of Robotics Research, vol. 34, Issue 4-5, 2014 (29 pages).

Whelan, T. et al., "ElasticFusion: Dense SLAM Without a Pose Graph," in proceedings of Robotics: Science and Systems, 2015 (9 pages).

International Search Report corresponding to International Patent Application No. PCT/EP2018/069483 (5 pages).

Whelan, T. et al., "ElasticFusion: Real-time dense SLAM and light source estimation," The International Journal of Robotics Research, vol. 35, No. 14, pp. 1697-1716, 2016 (20 pages).

Yan, Z. et al., "Dense Visual SLAM with Probabilistic Surfel Map," IEEE Transactions on Visualization and Computer Graphics, vol. 23, No. 11, pp. 2389-2398, 2017 (10 pages).

\* cited by examiner

Data: pose-pose constraints and pose-point constraints
Result: optimized PSM and camera trajectory
while *not reach the maximum number of iteration* do
    Perform optimization on pose-pose constraints only;
    Update PSM according to the new keyframe poses and remove pose-point outlier edges;
    Perform optimization on pose-point constraints only, with fixed point position;
    Update local chain of frames adjacent to each keyframe and remove pose-pose outlier edges;
    if *optimization converges* then
        | Break the loop;
    end
end
Perform optimization on pose-point constraints only, with fixed keyframe poses;

FIG. 7

DENSE VISUAL SLAM WITH PROBABILISTIC SURFEL MAP

This application claims the benefit of priority of U.S. provisional application Ser. No. 62/535,038, filed on Jul. 20, 2017 the disclosure of which is herein incorporated by reference in its entirety.

FIELD

The device and method disclosed in this document relates to image processing and, more particularly, to dense visual SLAM (Simultaneous Localization and Mapping) methods.

BACKGROUND

Unless otherwise indicated herein, the materials described in this section are not prior art to the claims in this application and are not admitted to the prior art by inclusion in this section.

Three-dimensional (3D) position tracking is one of the fundamental techniques required to align the virtual and real world together in Augmented Reality applications, but is also applicable to many other useful application. Visual SLAM (Simultaneous Localization and Mapping) is the dominant technology for reconstruction of camera trajectory and the environment, especially in absence of any prior knowledge on the environments. A visual SLAM system typically consists of a front-end and a back-end. Visual odometry is the front-end that estimates the per-frame camera pose, which is essential in Augmented Reality applications to seamlessly align virtual objects with the real world. In the back-end, normally, camera poses are refined through a global optimization. Some methods also reconstruct the model of the environment which can also be further used for many other purposes, such as 3D mapping, physically-based simulation, and animation. The majority of existing visual SLAM techniques can be grouped into two categories, frame-to-frame and frame-to-model approaches, based on how the back-end map information is maintained and utilized for front-end pose estimation.

Frame-to-frame approaches are typically keyframe-based and rely on pose-pose constraints between a frame and a keyframe for pose estimation (e.g., DVO and σ-DVO). Specifically, a set of keyframes are identified during the visual odometry. For each frame associated with a keyframe, a relative camera pose is computed with respect to this keyframe. When loop closure is detected, the current keyframe can be associated with previous keyframes to create more pose-pose constraints. Considering all the frames, a pose graph can be constructed that represents the pose-pose constraints across frames. Then a pose-graph optimization can be performed to refine the camera pose of each frame. However, frame-to-frame approaches do not maintain a global representation of the scene (e.g., point cloud) and suffer from accumulated camera drift.

In the frame-to-model approaches, such as PTAM, KinectFusion, and ElasticFusion, a global map of the scene is usually maintained and updated. Popular map representations include point clouds, surfel clouds, and volumetric fields. These approaches can provide accurate models of the environment. However, camera pose estimation is typically performed in a frame-to-model fashion, where only the pose-point constraint between the global map and the current frame observation is considered. Normally, the back-end optimization is performed to only optimize the keyframe poses and the global point cloud with pose-point constraints, which means that the other frames between keyframes are never optimized. Some frame-to-model approaches do not perform any form of global optimization at all. Consequently, the accuracy of the final camera trajectory is limited. For the approaches that only maintain sparse point clouds, generating accurate dense meshes is very challenging. Moreover, approaches using dense map representations, especially volumetric representation, typically suffer from low spatial resolution and rely heavily on GPU acceleration.

RGBD dense Visual SLAM approaches have shown their advantages in robustness and accuracy in recent years. However, there are still several challenges such as sensor noise and other inconsistences in RGBD measurements across multiple frames that could jeopardize the accuracy of both camera trajectory and scene reconstruction. It would be beneficial to provide a dense visual SLAM method that properly accounts for sensor noise and other inconsistences in sensor measurements. It would be further advantageous, the method utilized a both pose-pose and pose-point constraints in an efficient manner for back-end optimization.

SUMMARY

A method for visual simultaneous localization and mapping is disclosed. The method comprises: storing, in a memory, a first data structure having a plurality of surfels representing a 3D environment, each surfel having a 3D position, an uncertainty of the 3D position, an intensity, an uncertainty of the intensity, and a surface normal, the 3D position of each surfel being in a first coordinate space; receiving, with a processor, a first image of the 3D environment from a camera, the first image having an array of pixels, each pixel having an intensity and a depth; estimating, with the processor, a first camera pose from which the camera captured the first image based on the first image and the first data structure; and updating, with the processor, at least one surfel in the plurality of surfels of the first data structure based on the first image and the first camera pose.

A visual simultaneous localization and mapping system is disclosed. The system comprises: a camera configured to capture a plurality of images of a 3D environment, each image having an array of pixels, each pixel having an intensity and a depth; a memory configured to store a first data structure having a plurality of surfels representing the 3D environment, each surfel having a 3D position, an uncertainty of the 3D position, an intensity, an uncertainty of the intensity, and a surface normal, the 3D position of each surfel being in a first coordinate space; and a processor. The processor is configured to: receive a first image of the plurality of images of the 3D environment from the camera; estimate a first camera pose from which the camera captured the first image based on the first image and the first data structure; and update at least one surfel in the plurality of surfels of the first data structure based on the first image and the first camera pose.

BRIEF DESCRIPTION OF THE DRAWINGS

The foregoing aspects and other features of the method and system are explained in the following description, taken in connection with the accompanying drawings.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Three-Dimensional Localization and Mapping System

Figure 1:
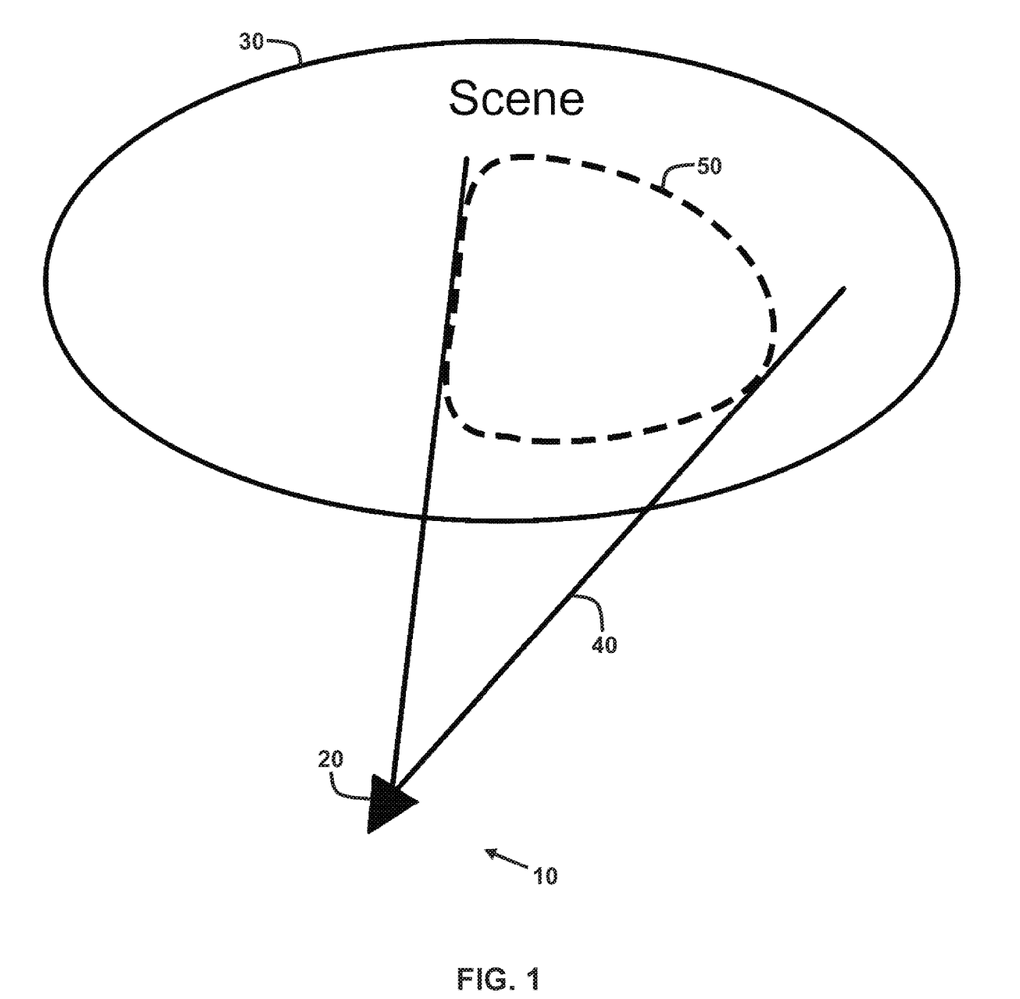
FIG. 1 shows an exemplary embodiment of a three-dimensional localization and mapping system.
Figure 2:
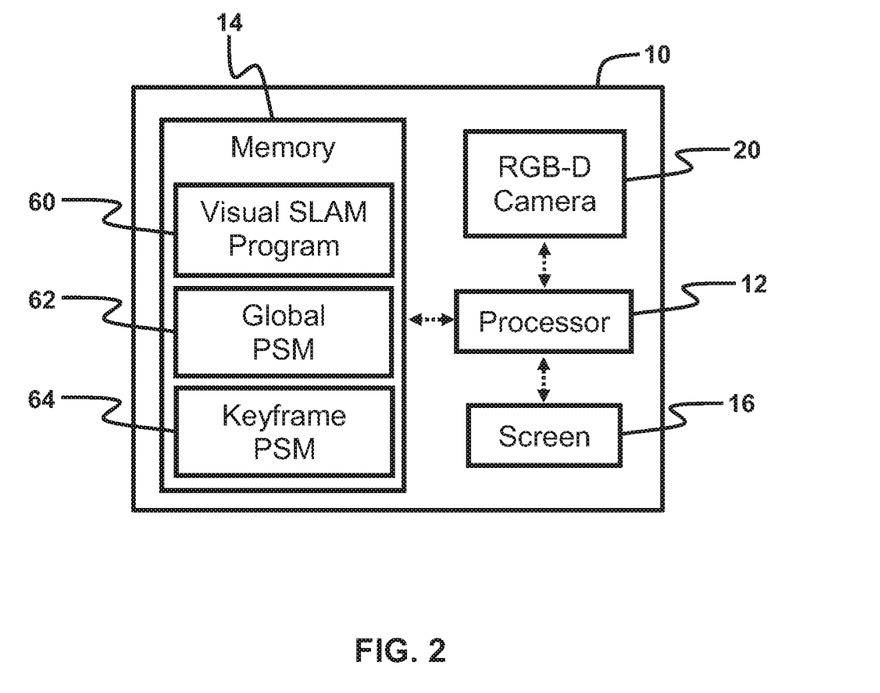
FIG. 2 shows exemplary components of the three-dimensional localization and mapping system of FIG. 1.

With reference to FIGS. 1-2, exemplary embodiments of a three-dimensional localization and mapping system 10 are shown. As shown in FIG. 1, the localization and mapping system 10 at least includes a camera 20. The camera 20 is configured to capture a plurality of images of a scene 30 as it is moved around the scene 30. The scene 30 comprises a real-world environment and, as such, may contain a variety of objects or structures therein. As shown, at a given camera position and orientation (camera pose), the camera 20 has a restricted field of view 40 such that an image captured by the camera 20 at the given camera pose only includes a corresponding portion 50 of the scene 30.

The camera 20 is configured to generate images of the scene 30 having both photometric information (intensity, color, and/or brightness) and geometric information (depth and/or distance). Particularly, in at least one embodiment, the camera 20 is an RGB-D camera configured to generate RGB-D images. Each RGB-D image comprises two-dimensional array of pixels. In at least one embodiment, each pixel includes RGB color intensity values and a depth value. However, it will be appreciated that the camera 20 may comprises a monochromatic and/or greyscale camera which captures images having pixels with only an intensity value and a depth.

FIG. 2 shows exemplary components of one embodiment of the three-dimensional localization and mapping system 10. Particularly, in addition to the camera 20, the localization and mapping system 10 further includes at least one processor 12 and memory 14. The memory 14 is configured to store program instructions that, when executed by the processor 12, enable the three-dimensional localization and mapping system 10 to perform various operations described elsewhere herein, including visual simultaneous localization and mapping (SLAM). The memory 14 may be of any type of device capable of storing information accessible by the processor 12, such as a memory card, ROM, RAM, hard drives, discs, flash memory, or any of various other computer-readable medium serving as data storage devices, as will be recognized by those of ordinary skill in the art. Additionally, it will be recognized by those of ordinary skill in the art that a "processor" includes any hardware system, hardware mechanism or hardware component that processes data, signals or other information. The processor 12 may include a system with a central processing unit, graphics processing units, multiple processing units, dedicated circuitry for achieving functionality, or other systems.

The processor 12 is configured to process the captured images of the scene 30 to perform visual odometry to estimate the position, orientation, and trajectory of the camera 20 with respect to the scene 30 across several frames. Additionally, the processor 12 is configured to generate a three-dimensional model or map representation of the scene 30.

It will be appreciated that such mapping of the scene 30 and localization of the camera 20 within the scene 30, has many useful applications such as augmented reality, three-dimensional environment mapping or object scanning, autonomous robot navigation (e.g. vehicles, vacuum cleaners, flying drones), and other similar robotics applications. Accordingly, the three-dimensional localization and mapping system 10 may take a variety of different forms such as a smartphone, a tablet computer, a handheld camera, a head mounted display, or a sensor/processing system of a robot and/or vehicle.

In some embodiments, particularly for augmented reality applications, the three-dimensional localization and mapping system 10 further includes a display screen 16. The display screen 16 may comprise any of various known types of displays, such as an LCD or OLED screen. In some embodiments, the display screen 16 may comprise a touch screen configured to receive touch inputs from a user. In augmented reality applications, the processor 12 may be configured to operate the display screen 16 to display real-time images/video captured by the camera 20 with virtual objects superimposed thereon.

Method for Dense Visual SLAM Using Probabilistic Surfel Maps

Methods for operating the augmented reality system 10 are described below. In particular, methods for dense visual SLAM are described. In the description of the methods, statements that a method is performing some task or function refers to a controller or general purpose processor executing programmed instructions stored in non-transitory computer readable storage media operatively connected to the controller or processor to manipulate data or to operate one or more components in the three-dimensional localization and mapping system 10 to perform the task or function. Particularly, the processor 12 of the three-dimensional localization and mapping system 10 above may be such a controller or processor. Alternatively, the controller or processor may be implemented with more than one processor and associated circuitry and components, each of which is configured to form one or more tasks or functions described herein. It will be appreciated that some or all of the operations the method can also be performed by a remote server or cloud processing infrastructure. Additionally, the steps of the methods may be performed in any feasible chronological order, regardless of the order shown in the figures or the order in which the steps are described.

With continued reference to FIG. 2, the memory 14 of the three-dimensional localization and mapping system 10 is configured to store program instructions corresponding to a visual SLAM program 60 which implements the methods described herein. The visual SLAM program 60 incorporates a map representation referred to herein as a "Probabilistic Surfel Map" (PSM). A probabilistic surfel map is a data structure which advantageously provides a globally consistent map representation having a plurality of surfels or points that are encoded with both photometric (intensity)

uncertainties and geometric (depth) uncertainties in order to address inconsistency and measurement noise issues with the RGB-D camera 20. We note that the terms "surfel" and "point" are used interchangeably herein with respect to the PSM data structure.

In conventional map representations, a scene point encodes a set of attributes representing different properties. For SLAM, typical attributes include 3D position, intensity and surface normal. However, due to various factors such as sensor measurement noise, occlusion and change of lighting conditions, there are usually mismatches across multiple observations of a single scene point. Those mismatches are the major sources of the accumulated drift in visual odometry.

To reduce the camera drift and construct a more accurate and consistent map, the PSM data structure disclosed herein encodes both the attributes as well as their uncertainties. Mathematically, we denote each point in the PSM according to the equation:

$$\mathcal{M}^i = \{\mathcal{M}_p^i, \mathcal{M}_{\Sigma_p}^i, \mathcal{M}_I^i, \mathcal{M}_{\sigma_I^2}^i, \mathcal{M}_n^i\}, \quad (1)$$

which represents the (accumulated) measurement of a scene point. It includes a 3D position $\mathcal{M}_p^i \in \mathbb{R}^3$, a positional uncertainty represented via a 3×3 covariance matrix $\mathcal{M}_{\Sigma_p}^i$, an intensity value $\mathcal{M}_I^i \in \mathbb{R}^1$, an intensity uncertainty $$\mathcal{M}_{\sigma_I^2}^i \in \mathbb{R}^1,$$

and a 3D normal $\mathcal{M}_n^i \in \mathbb{R}^3$. In at least one embodiment, the distribution of 3D positional uncertainty $\mathcal{M}_{\Sigma_p}^i$ is modeled with a three dimensional Gaussian $$\mathcal{N}(\mathcal{M}_p^i, \mathcal{M}_{\Sigma_p}^i),$$

and the distribution of intensity uncertainty $$\mathcal{M}_{\sigma_I^2}^i$$

is modeled with a one dimensional Gaussian $$\mathcal{N}(\mathcal{M}_I^i, \mathcal{M}_{\sigma_I^2}^i),$$

independently.

The PSM data structure is utilized in both the front-end visual odometry and the back-end map construction. Particularly, as will be discussed in greater detail below, the memory 14 is configured to store a global PSM 62 and a keyframe PSM 64. The global PSM 62 is a map representation of all portions of the scene 30 that have been captured in the images from the camera 20 and is used during the back-end optimization to provide pose-point constraints that are properly weighted through the encoded uncertainties. In contrast, the keyframe PSM 64 is a map representation of only a portion of the scene 30 that was captured in a most recent keyframe $K_j$ and is used during visual odometry to provide a more accurate reference for relative camera pose estimation. As used herein, $$\mathcal{M}^i = \{\mathcal{M}_p^i, \mathcal{M}_{\Sigma_p}^i, \mathcal{M}_I^i, \mathcal{M}_{\sigma_I^2}^i, \mathcal{M}_n^i\}$$

will be used to denote the global PSM 62 and $$\overline{\mathcal{M}}^i = \{\overline{\mathcal{M}}_p^i, \overline{\mathcal{M}}_{\Sigma_p}^i, \overline{\mathcal{M}}_I^i, \overline{\mathcal{M}}_{\sigma_I^2}^i, \overline{\mathcal{M}}_n^i\}$$

will be used to denote the keyframe PSM 64.

Figure 3:
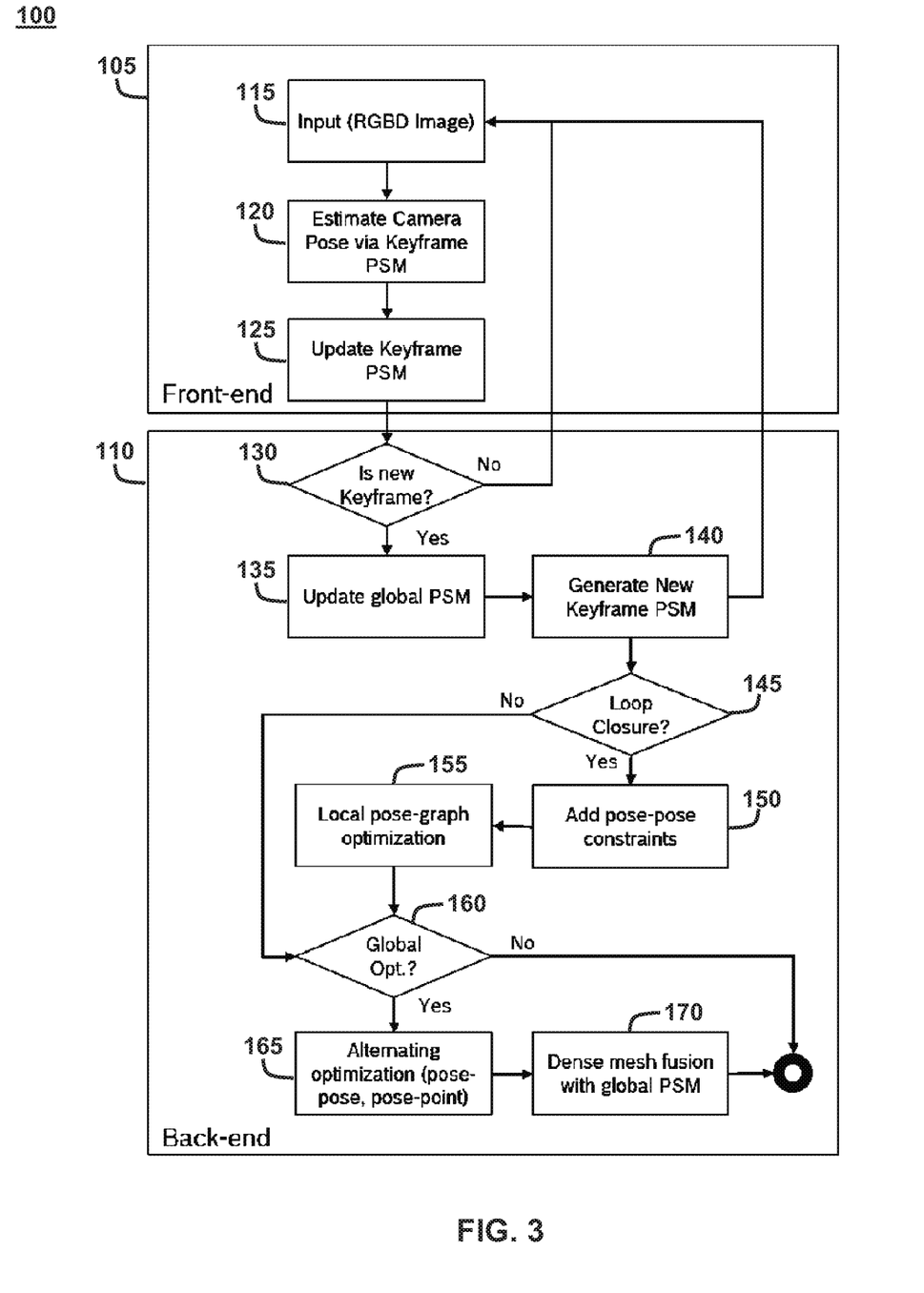
FIG. 3 shows a logical flow diagram for a method for performing dense visual SLAM using probabilistic surfel maps.

FIG. 3 shows a logical flow diagram for a method 100 for performing dense visual SLAM using probabilistic surfel maps. The method 100 includes a front-end 105 which performs visual odometry using the keyframe PSM 64 and a back-end 110 which constructs and optimizes the global PSM 62, from which the keyframe PSM 64 is derived. The method 100 improves upon the functioning of the three-dimensional localization and mapping system 10 and, more particularly, the functioning of the processor 12 thereof, by advantageously utilizing the PSM data structure for visual odometry in the front-end 105 and for optimization in the back-end 110. Compared to a volumetric representation, the PSM data structure advantageously maintains only discrete points and avoids the tremendous memory consumption that would result in limited spatial resolution. Additionally, the PSM data structure enables proper modeling and updating of globally consistent measurement uncertainties. As discussed in further detail below, instead of integrating massive number of points using a weighted average, the method 100 considers the distribution of fused points as the intersection of the distributions from the individuals. Using this approach, the photometric and geometric uncertainties of reliable points drop rapidly and these points be easily identified. With a sparse and reliable map, the method 100 requires less memory and computation during SLAM. Additionally, when a dense mesh is requested, the sparse map can be used as control points to deform dense point cloud from keyframes to produce a consistent dense mesh.

The method 100 begins with a step of receiving a current image frame from a camera (block 115). Particularly, with respect to the embodiments described in detail herein, the processor 12 of the three-dimensional localization and mapping system 10 is configured to execute instructions of the visual SLAM program 60 to receive an image frame from the camera 20. Particularly, in at least one embodiment, the processor 12 is configured to receive an RGB-D image frame from an RGB-D camera 20. As discussed above, each RGB-D image frame comprises two-dimensional array of pixels. In at least one embodiment, each pixel includes RGB color values and a depth value.

The method 100 continues with a step of estimating a camera pose for the current frame using the keyframe PSM (block 120). Particularly, with respect to the embodiments described in detail herein, the processor 12 is configured to execute instructions of the visual SLAM program 60 to estimate a relative camera pose between the current RGB-D image frame and the keyframe PSM 64. More particularly, the processor 12 is configured to calculate the optimal relative camera pose that minimizes photometric and geometric errors between the points $\overline{\mathcal{M}}^i$ of the keyframe PSM 64 and measurements of the current RGB-D image frame, when the points $\bar{\mathcal{M}}^i$ of the keyframe PSM 64 are transformed into the camera coordinate space of the current RGB-D image frame using the relative camera pose.

Particularly, each RGB-D pixel of the current RGB-D image frame can be treated as a measurement and is modeled in a similar way as a point in the PSM data structure. Particularly, each measurement is modeled as two Gaussians distributions and one normal denoted as $\{p^i, \Sigma_p^i, I^i, \sigma_I^{i^2}, n\}$, where $p^i$ is a 3D point in the camera coordinate space generated from the corresponding RGB-D pixel, $\Sigma_p^i$ is the positional uncertainty in the camera coordinate space and is computed based-on a sensor noise model for the RGB-D camera 20; $I^i$ is the intensity of the corresponding RGB-D pixel, $\sigma_I^{i^2}$ is the intensity uncertainty and is assigned a large constant (e.g., 256); and n is the normal of the point $p^i$ and is approximated with a cross product of two vectors, one from point $p^i$ to its neighboring pixel in the right and another from $p^i$ to its neighboring pixel below. As used herein the term "camera coordinate space" refers to the 3D coordinate space relative to the current RGB-D image frame.

In at least one embodiment, the processor 12 is configured compute the positional uncertainty $\Sigma_p^i$ with a sensor noise model that models the uncertainty. For example, zero-mean multivariate Gaussian distributions can be used for structure light-based RGB-D camera 20. In many embodiments, the RGB-D camera 20 emits infra-red patterns and recovers depth from correspondences between two image views with a small parallax. During this process, the disparity is quantized into sub-pixels, which introduces a quantization error in the depth measurement. The noise due to quantization error is defined as:

$$\eta(Z_i) = \frac{q_{pix} bf}{2} \left[ \frac{1}{Rnd\left(\frac{q_{pix} bf}{z_i} - 0.5\right)} - \frac{1}{Rnd\left(\frac{q_{pix} bf}{z_i} + 0.5\right)} \right], \quad (2)$$

where $q_{pix}$ is the sub-pixel resolution of the device, b is the baseline, and f is the focal length.

This error increases quadratically with range $Z_i$, thus preventing the use of depth observations from far objects. The 3D sensor noise of RGB-D cameras can be modeled with a zero-mean multivariate Gaussian distribution whose covariance matrix has the following as diagonal components:

$$\sigma_{11}^2 = \tan\left(\frac{\beta_x}{2}\right) Z_i, \sigma_{22}^2 = \tan\left(\frac{\beta_y}{2}\right) Z_i, \sigma_{33}^2 = \eta(Z_i)^2, \quad (3)$$

where the $\sigma_{33}^2$ is directed along the ray, and $\beta_x$ and $\beta_y$ denote the angular resolutions in x and y directions. Note that the error in the ray direction increases quadratically.

Therefore, the positional uncertainty $\Sigma_p^i$ for each 3D point $p^i$ can be expressed as:

$$\Sigma_p^i = R_{ray} \text{diag}(\sigma_{11}^2, \sigma_{22}^2, \sigma_{33}^2) R_{ray}^T \quad (4),$$

where $R_{ray}$ denotes the rotation matrix between the ray and camera coordinates, and $R_{ray}^T$ is the transpose of $R_{ray}$.

A camera pose is a rigid body transformation in special Euclidean group SE(3). Thus, the relative camera pose between the current RGB-D image frame and the keyframe PSM 64 can be expressed as a 4×4 homogeneous transformation matrix T, which includes a 3×3 rotation matrix $R \in SO(3)$ and a 3D translation vector $t \in \mathbb{R}^3$. Given a point $\bar{\mathcal{M}}^i$ in the in keyframe PSM 64 and a camera pose T corresponding to a certain frame, we can transform the 3D position $\bar{\mathcal{M}}_p^i$ of the point $\bar{\mathcal{M}}^i$ from the PSM coordinate space to the camera coordinate space as $p_i$: $p_i = g(\bar{\mathcal{M}}_p^i; T) = Rp_i + t$. The inverse transformation $T^{-1}$ transforms $p_i$ from the camera coordinate space back to the PSM coordinate space. Generally, for pose optimization, the transformation T is represented as a six dimensional twist vector $\xi$ given by Lie algebra se(3). The transformation T and $\xi$ are used interchangeably to denote a camera pose. As used herein the term "PSM coordinate space" (which may also be referred to herein as the "world coordinate space" or "world space") refers to the 3D coordinate space of the keyframe PSM 64 and the global PSM 62.

Projection of a point $p_i$ in the camera coordinate space onto the 2D image space of the an RGB-D image frame is denoted herein by the projection function $x_i = \pi(p_i)$. Similarly, back-projection of a 2D point $x_i$ with depth value $Z(x_i)$ into the camera coordinate space is denoted herein as $p_i = \pi^{-1}(x_i \cdot Z(x_i))$. For a projected point 2D point $x_i$, the corresponding intensity and depth measurements based on the respective RGB-D image are denoted herein as $I(x_i)$ and $Z(x_i)$, respectively, and may be determined as an interpolation of neighboring pixels in the RGB-D image.

As mentioned above, the processor 12 is configured to estimate a relative camera pose $\xi$ between the current RGB-D image frame and the keyframe PSM 64. Particularly, the processor 12 is configured to calculate the optimal relative camera pose that minimizes photometric and geometric errors between the points $\bar{\mathcal{M}}^i$ of the keyframe PSM 64 and the measurements of the current RGB-D image frame, when the points $\bar{\mathcal{M}}^i$ of the keyframe PSM 64 are transformed into the camera coordinate space of the current RGB-D image frame using the relative camera pose. Given the camera projection model and rigid body motion, the photometric and geometric errors of each point are defined by a residual error term $r_i$ according to the equation:

$$r_i = \begin{bmatrix} r_i^I \\ r_i^Z \end{bmatrix} = \begin{bmatrix} I(\bar{x}_i(\xi)) - \bar{I}^i \\ Z(\bar{x}_i(\xi)) - \bar{Z}^i \end{bmatrix}, \quad (5)$$

where $r_i^I$ is the photometric error, $r_i^Z$ is the geometric error, the 2D point $\bar{x}_i(\xi)$ represents a projection of a respective point in the most recent keyframe $K_j$ onto the current RGB-D image frame with the relative camera pose $\xi$, $I(\bar{x}_i(\xi))$ represents a photometric measurement at the 2D point $\bar{x}_i(\xi)$ in the current RGB-D image frame, $\bar{I}^i$ denotes the corresponding photometric measurement in the keyframe $K_j$, $Z(\bar{x}_i(\xi))$ represents a geometric measurement at the 2D point $\bar{x}_i(\xi)$ in the current RGB-D image frame, and $\bar{Z}^i$ denotes the corresponding geometric measurement in the keyframe $K_j$.

However, with the Keyframe PSM 64, we can re-define the residual term of equation (5) with the following changes:

$$\bar{x}_i(\xi) = \pi(g(\bar{\mathcal{M}}_p^i, \xi))$$

$$\bar{I}^i = \bar{\mathcal{M}}_I^i$$

$$\bar{Z}^i = [g(\bar{\mathcal{M}}_p^i, \xi)]_z \quad (6),$$

where $\pi(g(\bar{\mathcal{M}}_p^i, \xi))$ represents the represents a projection of a respective point $\bar{\mathcal{M}}^i$ in the keyframe PSM 64 onto the current RGB-D image frame with the relative camera pose $\xi$, $\bar{\mathcal{M}}_I^i$ denotes the photometric intensity of the respective point $\bar{\mathcal{M}}^i$, $\bar{\mathcal{M}}_p^i$ denotes the 3D position of the respective point $\bar{\mathcal{M}}^i$ in the PSM coordinate space, and $[g(\bar{\mathcal{M}}_p^i, \xi)]_z$ denotes the z component of the respective point $\bar{M}^i$ transformed into the camera coordinate space.

Using the notations described above, the calculation of the optimal relative camera pose $\xi$ can be expressed mathematically according to the energy function:

$$\xi = arg\ min_\xi \Sigma_{i=1}^n r_i^T W_i r_i \qquad (7),$$

where n is the total number of points $\bar{M}^i$ or number of reliable points $\bar{M}^i$ in the keyframe PSM 64, $r_i^T$ is the transpose of the residual error term $r_i$, and $W_i$ is a 2×2 weighting matrix which leverages the importance of each residue term. In at least one embodiment, the optimization of this energy function can be solved through an image-warping optimization framework such as the Lucas-Kanade algorithm with an inverse-composition loss function.

As the energy function from the equation (7) is non-linear with respect to the camera pose $\xi$, the least squares optimization is sensitive to outliers. So the matrix $W_i$ plays a vital role in rejecting/under-weighting outliers to achieve robust camera pose estimation. In at least one embodiment, the distribution of photometric residuals is modeled as being close to a zero-mean student-t distribution with five degrees of freedom (i.e., v=5):

$$p(r_i | \xi) = \frac{\Gamma\left(\frac{(v+1)}{2}\right)}{\Gamma\left(\frac{v}{2}\right) v\pi \sqrt{|\Sigma_t|}} \left(1 + \frac{1}{v} r_i^T \Sigma_t^{-1} r_i\right)^{-\frac{(v+1)}{2}}. \qquad (8)$$

In contrast, in one embodiment, the sensor noise model described above is used to model the distribution of geometric residuals. Thus, in at least one embodiment, a hybrid weighting strategy is used, which applies student-t distribution for the photometric residuals and the sensor noise model for the geometric residuals. Such a hybrid weighting advantageously achieves a significant boost in robustness and accuracy. In the hybrid weighting strategy, the weight matrix $W_i$ is modeled as $$W_i = W_i^{1/2} \Lambda W_i^{1/2}, \qquad (9)$$

$$W_i^{\frac{1}{2}} = diag(\omega_i^I, \omega_i^Z), \qquad (10)$$

$$\omega_i^I = \frac{v+1}{v + \left(\frac{r_i^I}{\sigma_I}\right)^2},\ and \qquad (11)$$

$$\omega_i^Z = \left(\nabla r_i^Z \Sigma_{p_i}^{01} \nabla r_i^{Z^T} + [\Sigma_{p_i'}]_{3,3}\right)^{-1}. \qquad (12)$$

In equations (9)-(12), $\omega_i^I$ is a weight based on the intensity student-t distribution, while $\omega_i^Z$ is propagated from the sensor noise model via first-order Taylor expansion. $\Sigma_{p_i}$ and $$\Sigma_{p_i'}$$

are the covariance of the 3D point $p_i$ and its corresponding point in current image $p'_i$. $\Lambda$ here is a normalizer of all the weights in $W_1$. By combining the equations (6)-(12) with equation (7), the calculation of the optimal relative camera pose with hybrid approach can be described as:

$$\xi_{Hybrid} = argmin_\xi \Sigma_{i=1}^n r_i^T W_i^{1/2} \nabla W_i^{1/2} r_i \qquad (13).$$

The method 100 continues with a step of updating the keyframe PSM using the current frame (block 125). Particularly, with respect to the embodiments described in detail herein, once the relative camera pose $\xi$ for the current RGB-D image frame is calculated, the processor 12 is configured to execute instructions of the visual SLAM program 60 to update the keyframe PSM 64 with the observation points of the current RGB-D image frame. More particularly, once the relative camera pose $\xi$ for the current RGB-D image frame is calculated, the processor 12 is configured to update the 3D positions $\bar{M}_p^i$, the positional uncertainties $\bar{M}_{\Sigma_p}^i$, the intensities $\bar{M}_I^i$, and the intensity uncertainties $$\bar{M}_{\sigma_I}^i$$

of each point in the keyframe PSM 64 having an associated point in the current RGB-D image frame.

As discussed above, due to various factors including sensor noise, changes of lighting conditions, etc., the sensor measurements in any particular RGB-D image frame are considered to be biased observations with modeled with uncertainties. However, over several frames, the processor 12 is configured to update the uncertainties via a fusion of their respective probabilistic density functions. Through the gradual update of the keyframe PSM 64 during visual odometry, the method 100 builds a consistent and reliable model of the environment.

Once the relative camera pose $\xi$ for the current RGB-D image frame is calculated, the processor 12 is configured to update the keyframe PSM 64 with the observations from the current RGB-D image frame. First, the processor 12 is configured to calculate a plurality of observation points $\{p^i, \Sigma_p^i, I^i, \sigma_I^{i'}, n\}$ in the PSM coordinate space corresponding to a plurality of 2D points $x_i$ in the 2D image space of the current RGB-D image frame, each of which are the interpolation of neighbor RGB-D pixels at a projection of the keyframe PSM 64 onto the current RGB-D image frame. Particularly, in at least one embodiment, the processor 12 is configured to calculate the observation points according to the equations:

$$p^{i'} = \pi^{-1}(x_i, Z(x_i))$$

$$p^i = g(p^{i'}, T^{-1})$$

$$\Sigma_p^i = R^T \Sigma_p^i R$$

$$I^i = I(x_i)$$

$$\sigma_I^i = \sigma_I(x_i)$$

$$n = g((p_{xn}^{i'} - p^{i'}) \times (p_{yn}^{i'} - p^{i'}), T^{-1}) \qquad (14),$$

where $p^{i'}$ is the 3D position of the respective observation point in the camera coordinate space, $p^i$ is the 3D position of the respective observation point in the PSM coordinate space, $\Sigma_p^i$ is the positional uncertainty of the respective observation point transformed into the PSM coordinate space, $I^i$ is the intensity of the respective observation point, $\sigma_I^i$ is the intensity uncertainty of the respective observation point, and n is the normal of the respective observation point transformed into the PSM coordinate space.

It will be appreciated that each of these observation points is associated with a corresponding point $\bar{M}^i$ in the keyframe PSM 64. Therefore, given a new observation point, the processor 12 is configured to update the corresponding point $\bar{M}^i$ in the keyframe PSM 64 with a fusion of two Gaussian distributions for both the position and the intensity according to the equations:

$$\mathcal{N}(\bar{M}_p^i, \bar{M}_{\Sigma_p}^i) \times \mathcal{N}(p^i, \Sigma_p^i)$$

$$\mathcal{N}(\bar{M}_I^i, \bar{M}_{\sigma_I^2}^i) \times \mathcal{N}(I^i, \sigma_I^{i2}) \quad (15).$$

We denote this update operation with the symbol ⊕. With the Gaussian distribution modeling, the update operation can be described in more detail as follows:

$$\bar{M}_p^i \oplus \{p^i, \Sigma_p^i, I^i, \sigma_I^{i2}, n\} \equiv \{\hat{M}_p^i, \hat{M}_{\Sigma_p}^i, \hat{M}_I^i, \hat{M}_{\sigma_I^2}^i, \hat{M}_n^i\}, \text{ and} \quad (16)$$

$$\hat{M}_{\Sigma_p}^i = \left(\bar{M}_{\Sigma_p}^{i-1} + \Sigma_p^{i-1}\right)^{-1} \quad (17)$$

$$\hat{M}_p^i = \hat{M}_{\Sigma_p}^{i-1}\left(\bar{M}_{\Sigma_p}^{i-1}\bar{M}_p^i + \Sigma_p^{i-1}p^i\right)$$

$$\hat{M}_{\sigma_I^2}^i = \frac{\sigma_I^{i2}\bar{M}_{\sigma_I^2}^i}{\bar{M}_{\sigma_I^2}^i + \sigma_I^{i2}}$$

$$\hat{M}_I^i = \frac{\sigma_I^{i2}\bar{M}_I^i + \bar{M}_{\sigma_I^2}^i I^i}{\bar{M}_{\sigma_I^2}^i + \sigma_I^{i2}}$$

$$\hat{M}_n^i = \bar{M}_n^i,$$

where $\hat{M}_p^i$ is the updated 3D position of the respective point $\bar{M}^i$ in the keyframe PSM 64, $\hat{M}_{\Sigma_q}^i$ is the updated positional uncertainty of the respective point $\bar{M}^i$ in the keyframe PSM 64, $\hat{M}_I^i$ is the updated intensity of the respective point $\bar{M}^i$ in the keyframe PSM 64, $$\hat{M}_{\sigma_I^2}^i$$

is the updated intensity uncertainty of the respective point $\bar{M}^i$ in the keyframe PSM 64, and $\hat{M}_n^i$ is the normal of the respective point $\bar{M}^i$ in the keyframe PSM 64.

By updating the keyframe PSM 64 after each image frame using the above operation, the uncertainties $$\hat{M}_{\sigma_I^2}^i$$

and $\hat{M}_{\Sigma_p}^i$ will drop quickly if observation points are correctly associated with the points $\bar{M}^i$ of the keyframe PSM 64. This is because the method 100 takes the intersection between Gaussian distributions during fusion, which is the major difference from conventional visual SLAM methods. In at least one embodiment, the normal $\hat{M}_n^i$ is only used to eliminate incorrect associations, we simply keep the original normal instead of updating it with new measurements. In other words, if the normal of the generated observation point in the PSM coordinate space is not equal to or at least within a predetermined threshold closeness of the normal of a respective point $\bar{M}^i$ of the keyframe PSM 64, the association is considered to be incorrect and the respective point $\bar{M}^i$ is not updated with the observation point.

The steps 115, 120, and 125 collectively comprise the front-end 105 of the method 100, and are performed for each RGB-D image frame received by the processor 12 from the RGB-D camera 20. Accordingly, the keyframe PSM 64 is continually updated a refined until a new keyframe is selected, thereby improving the visual odometry performed with respect to each intermediate RGB-D image frame. Below we describe how the PSM data structure, in particular the global PSM 62, is utilized in the back-end 110 to improve performance in keyframe selection and global optimization.

The method 100 continues with a step of determining whether the current frame should be selected as a new keyframe (block 130). Particularly, with respect to the embodiments described in detail herein, the processor 12 is configured to execute instructions of the visual SLAM program 60 to determine whether the current RGB-D image frame should be treated as a new keyframe $K_{j+1}$ based on at least one criterion.

In one embodiment, the processor 12 is configured to select the current RGB-D image frame to be a new keyframe $K_{j+1}$ in response to the current RGB-D image frame being captured more than a predetermined threshold amount of time since the most recent keyframe $K_j$ was captured.

In one embodiment, the processor 12 is configured to select the current RGB-D image frame to be a new keyframe $K_{j+1}$ in response to the calculated relative camera pose $\xi$ for the current RGB-D image frame being greater than a predetermined spatial distance from a camera pose $\xi_{K_j}$ of the most recent keyframe $K_j$.

In one embodiment, the processor 12 is configured to select the current RGB-D image frame to be a new keyframe $K_{j+1}$ in response to the entropy of the calculated relative camera pose between the most recent keyframe $K_j$ and the current RGB-D image frame being lower than a predetermined threshold ratio of the entropy of the camera pose between the most recent keyframe $K_j$ and its adjacent frame $K_j+1$.

In one embodiment, the processor 12 is configured to select the current RGB-D image frame to be a new keyframe $K_{j+1}$ in response to a number of points in the keyframe PSM 64 being active points and/or visible points in the current RGB-D image frame being lower than a predetermined threshold.

In one embodiment, the processor 12 is configured to select the current RGB-D image frame to be a new keyframe $K_{j+1}$ in response to an average uncertainty of intensity $$\frac{\sum_{i=0}^{n} \bar{M}_{\sigma_I^2}^i}{n}$$

or an average uncertainty of depth $$\frac{\sum_{i=0}^{n} \bar{M}_{\Sigma_p}^i}{n}$$

within the keyframe PSM of current keyframe $K_j$ being higher than a respective predetermined threshold that indicates significant mismatch between the map and current frame.

We note that if the current RGB-D image frame is a first image frame and no keyframes have yet been selected, then the processor 12 is configured to automatically select the current RGB-D image frame as a new keyframe $K_{j+1}$.

If a new keyframe is selected, the method 100 continues with a step of updating the global PSM based on the keyframe PSM (block 135). Particularly, with respect to the embodiments described in detail herein, once a new keyframe $K_{j+1}$ is selected, the processor 12 is configured to execute instructions of the visual SLAM program 60 to update the global PSM 62 with the points $\bar{\mathcal{M}}^i$ of the keyframe PSM 64 of the previous keyframe $K_j$. More particularly, once a new keyframe $K_{j+1}$ is selected, the processor 12 is configured to update the 3D positions $\mathcal{M}_p^i$, the positional uncertainties $\mathcal{M}_{\Sigma_p}^i$, the intensities $\mathcal{M}_I^i$, and the intensity uncertainties $$\mathcal{M}_{\sigma_I^2}^i$$

or each point $\mathcal{M}^i$ in the global PSM 62 having an associated point $\bar{\mathcal{M}}^i$ in the keyframe PSM 64. Additionally, in some embodiments, the processor 12 is configured to add any new points $\bar{\mathcal{M}}^i$ of the keyframe PSM 64 that do not have an associated point $\mathcal{M}^i$ in the global PSM 62 to the global PSM 62.

The processor 12 is configured to update the global PSM 62 with the points of the keyframe PSM 64 in a similar manner as described above with respect to block 125 of FIG. 3, in which the keyframe PSM 64 was updated based on each intermediate image frame. Particularly, the processor 12 is configured to treat the points $\bar{\mathcal{M}}^i$ of the keyframe PSM 64 as a plurality of observation points $\{p^i, \Sigma_p^i, I^i, \sigma_I^{i^2}, n\}$ and update the positional uncertainties $\mathcal{M}_{\Sigma_p}^i$ and the intensity uncertainties $$\mathcal{M}_{\sigma_I^2}^i$$

of each point $\mathcal{M}^i$ in the global PSM 62 having an associated point $\bar{\mathcal{M}}^i$ in the keyframe PSM 64 using the equations (15)-(17), in the manner discussed above.

The method 100 continues with a step of generating a new keyframe PSM for the new keyframe (block 140). Particularly, with respect to the embodiments described in detail herein, the processor 12 is configured to execute instructions of the visual SLAM program 60 to generate a new keyframe PSM 64 based on the global PSM and any new observations in the new keyframe $K_{j+1}$.

Figure 4:
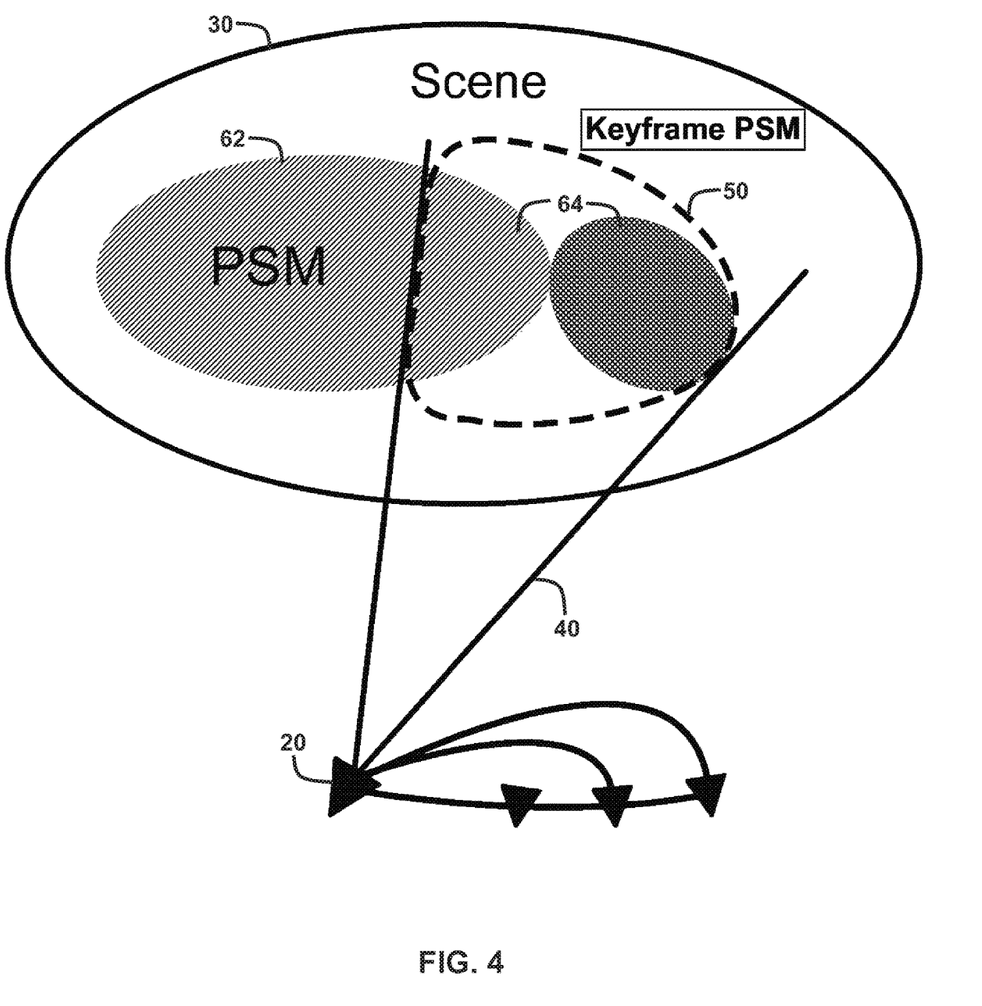
FIG. 4 shows the generation of a new keyframe probabilistic surfel maps using a new keyframe and a global probabilistic surfel map.

During visual odometry, the keyframe PSM 64 typically covers only part of scene. With a new keyframe $K_{j+1}$ identified, it is very likely there will be new observations of the scene that does not exist in the global PSM 62 yet. The processor 12 is configured to generate the new keyframe PSM 64 for new keyframe $K_{j+1}$ by combining existing parts in the global PSM 62 that are visible in new keyframe $K_{j+1}$ with the new observations from new keyframe $K_{j+1}$. As shown in FIG. 4, we project the global PSM 62 onto the image space of the new keyframe $K_{j+1}$ and identify active points from of global PSM 62 (shaded with a diagonal pattern) that are visible in the new keyframe $K_{j+1}$. Additionally, for the new regions (shaded with a cross-hatch pattern) in the keyframe that have no overlap with the global PSM, the processor 12 is configured back-project them into the camera coordinate space of the new keyframe $K_{j+1}$ to obtain another set of observation points. For these points, the variance for intensity uncertainty is set to a default value $\sigma_I^{o^2}$, while the covariance matrix for positional uncertainty is derived from the sensor noise model, discussed above. Thus, the processor 12 is configured to generate the new keyframe PSM 64 with the active/visible points of the global PSM 62 and with any new observation points that do not overlap with the global PSM 62.

In at least one embodiment, the processor 12 is configured to prune and/or remove the points $\bar{\mathcal{M}}^i$ of the new keyframe PSM 64 having with positional uncertainty $\bar{\mathcal{M}}_{\Sigma_p}^i$ beyond a predetermined threshold. Thus, only the reliable points are included in the keyframe PSM 64. Additionally, in some embodiments, after the initial pruning, the processor 12 is configured to keep only a ratio of the rest points past pruning. Thus, the keyframe PSM 64 is generally more sparsely populated than the global PSM 62, which improves processing speed.

Returning to FIG. 3, once the new keyframe PSM 64 is generated, the method 100 returns to the processes of the front-end 105 to perform visual odometry for new RGB-D image frames with respect to the new keyframe $K_{j+1}$ according the blocks 115, 120, and 125.

In addition to returning the to the processes of the front-end 105, the method 100 continues in the back-end 110 with a step of detecting whether there is a loop closure (block 145) and, if a loop closure is detected, with steps of adding pose-pose constraints (block 150) and performing local pose-graph optimization (block 155). Particularly, with respect to the embodiments described in detail herein, the processor 12 is configured to execute instructions of the visual SLAM program 60 to detect whether the newly selected keyframe $K_{j+1}$ comprises a loop-closure with respect to a previous keyframe $K_0, \ldots, K_j$ and, if loop closure is detected, generate pose-pose constraints based on the detected loop-closure, and perform local pose-graph optimization based on the pose-pose constraints.

Particularly, in the back-end 110, the processor 12 is configured to maintain and/or store in the memory 14 a pose-graph having nodes and edges. As used herein, a "pose-graph" refers to a data structure having a plurality of nodes which define values or measurements and a plurality of edges connecting pairs of nodes which define a relationship between the values or measurements of the connected nodes.

Figure 5:
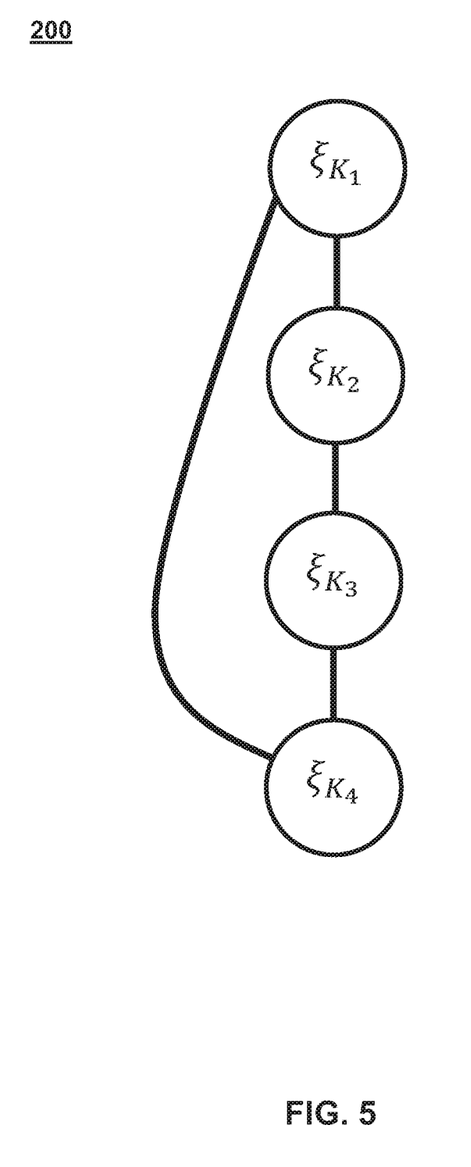
FIG. 5 shows a pose-graph having pose-pose constraints.

As new keyframes $K_j$ are selected, the processor 12 is configured to add their keyframe camera poses $\xi_{K_j}$ as new nodes in a pose-graph and their relative transformations as edges in the pose-graph, thereby creating a chain of keyframe camera poses $\xi_{K_j}$ linked by pose-pose constraints. As used herein, a "pose-pose constraint" is a relative transformation between two camera poses. FIG. 5 shows a pose-graph 200 which is used for local optimization based on pose-pose constraints. Each pose (shown as nodes/circles) of the pose-graph 200 is a keyframe camera pose $\xi_{K_j}$ of a keyframe $K_j$. Each pose-pose constraint (shown as solid edges/lines) of the pose-graph 200 represents relative transformations between the two respective keyframe camera poses $\xi_{K_j}$.

To correct for the accumulated error in the trajectory, the processor 12 is configured to search for loop-closures to previously visited keyframes. As used herein, a loop-closure refers to when a keyframe pose is determined to be the same as a previous keyframe pose or within a predetermined closeness to a previous keyframe pose. To identify candidate previous keyframes that might form a loop closure with the new keyframe, the processor 12 is configured to search nearest neighbor keyframe poses in a kd-tree. In one embodiment, in order to validate a loop-closure, the processor 12 use the entropy ratio test discussed above for keyframe selection. However, instead of the entropy of the transformation of the first frame to the keyframe, the processor 12 is configured to use the average entropy of all successful matches of intermediate frames to the keyframe. If a valid loop closure is detected, the processor 12 adds a new edge (pose-pose constraint) to the pose-graph. As shown in FIG. 5, the pose-graph 200 includes an additional pose-pose constraint between the keyframe camera poses $\xi_{K_1}$ and $\xi_{K_4}$, indicating a loop closure.

Afterwards, the processor 12 is configured to correct errors in the keyframe poses $\xi_{K_j}$ and/or optimize the keyframe poses $\xi_{K_j}$ based on the pose-pose constraints by solving a non-linear least squares optimization problem. In one embodiment, the processor 12 uses a graph optimization framework to correct the errors such as the framework described in "G2o: A general framework for graph optimization," in 2011 IEEE International Conference on Robotics and Automation (ICRA) by R. Kummerle, G. Grisetti, H. Strasdat, K. Konolige and W. Burgard.

Returning to FIG. 3, the method 100 continues with a step of determining whether global optimization should be performed (block 160). Particularly, the local pose-graph optimization based on the pose-pose constraints, discussed above, can be performed in real-time while the method 100 continues to receive new RGB-D image frames from the camera 20. However, further global optimization can be performed by establishing pose-point constraints using the global PSM 62. In at least one embodiment, the processor 12 is configured to determine that global optimization is to be performed once the method 100 has stopped receiving new RGB-D image frames. However, in some embodiments, global optimization may be performed periodically in real-time.

If global optimization is to be performed, the method 100 continues with a step of iteratively alternating between pose-pose optimization and pose-point optimization (block 165). Particularly, with respect to the embodiments described in detail herein, the processor 12 is configured to execute instructions of the visual SLAM program 60 to add pose-point constraints to the pose-graph and perform global optimization based on the pose-point constraints and the pose-pose constraints.

Particularly, as discussed above, the processor 12 is configured to maintain and/or store in the memory 14 a pose-graph having a plurality of nodes which define values or measurements and a plurality of edges connecting pairs of nodes which define a relationship between the values or measurements of the connected nodes. As described above, a plurality keyframe camera pose $\xi_{K_j}$ of a keyframes $K_j$ were added as nodes of the pose-graph and a plurality of pose-pose constraints were added as edges of the pose-graph.

Figure 6:
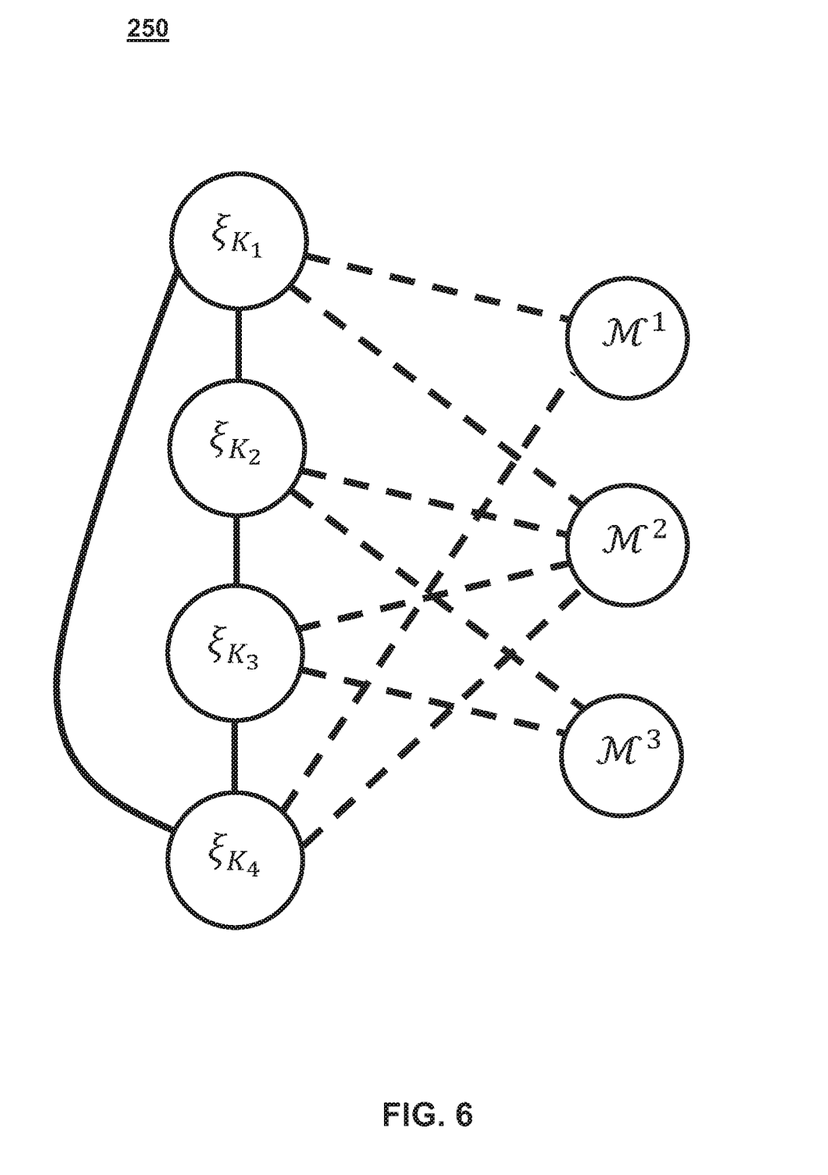
FIG. 6 shows a pose-graph having pose-pose constraints and pose-point constraints.

When global optimization is performed, the global PSM 62 provides pose-point constraints that are properly weighted through the encoded uncertainties, which are be used to improve both trajectory and map accuracy. Particularly, the processor 12 is configured to add points $\mathcal{M}^i$ from the global PSM 62 to the pose-graph and add pose-point constraints indicating the consistencies and/or differences between the PSM points $\mathcal{M}^i$ and their local observations from a transformation/projection to the camera coordinate space of each keyframes $K_j$ in which they are visible. FIG. 6 shows a pose-graph 250 which is used for global optimization based on pose-pose constraints and pose-point constraints. In addition to the a keyframe camera poses $\xi_{K_j}$ of the keyframes $K_j$, the pose-graph 250 includes PSM points $\mathcal{M}^i$ (shown as nodes/circles) and pose-point constraint (shown as dashed edges/lines), which represents a transformation/projection of the PSM points $\mathcal{M}^i$ in to the keyframes $K_j$. In this way, during global optimization, the method 100 enforces both pose-pose constraints and pose-point constraints.

For the pose-point constraints, the measurements from PSM point $\mathcal{M}^i$ are the intensity $\mathcal{M}_I^i$ and the depth value of the point's projection in the keyframe $[g(\mathcal{M}_p^i, \xi)]_z$; the local measurements are $I_j(\bar{x}_i(\xi))$ and $Z_j(\bar{x}_i(\xi))$ from keyframes $K_j$. The processor 12 is configured to optimize an error function similar to equation (13) using a residual term similar to equation (5), but with the following definition changes:

$$\bar{x}_i(\xi) = \pi(g(\mathcal{M}_p^i, \xi))$$

$$\bar{I}^i = \mathcal{M}_I^i$$

$$\bar{Z}^i = [g(\mathcal{M}_p^i, \xi)]_z \qquad (18).$$

Note that, in the equations (18), $\xi$ represents the transformation from the PSM coordinate space of the global PSM 62 to the camera coordinate space of the corresponding keyframe $K_j$ instead of a relative camera pose. By minimizing the error function, both camera poses and 3D positions of the points can be optimized.

Given the complete pose-graph having poses, points, pose-pose constraints, and pose-point constraints, the processor 12 is configured to correct errors in and/or optimize the keyframe poses $\xi_{K_j}$ and the points $\mathcal{M}^i$ based on the pose-pose and pose-point constraints by solving a non-linear least squares optimization problem. In one embodiment, the processor 12 uses a graph optimization framework to correct the errors such as the framework described in "G2o: A general framework for graph optimization," in 2011 IEEE International Conference on Robotics and Automation (ICRA) by R. Kummerle, G. Grisetti, H. Strasdat, K. Konolige and W. Burgard.

Figure 7:
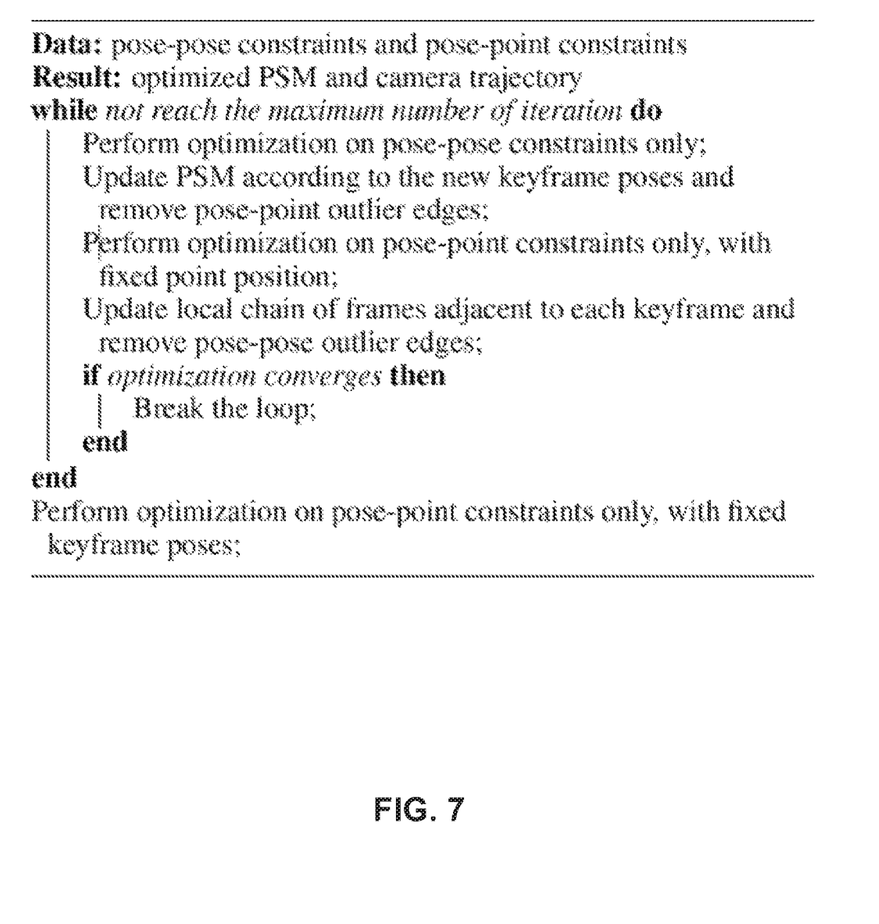
FIG. 7 shows an alternating pose-pose and pose-point iterative optimization strategy.

However, the error function for pose-point constraints is non-linear and sensitive to noises and outliers. Accordingly, in at least one embodiment, the processor 12 is configured to perform an iterative optimization process which alternates between optimizing only pose-pose constraints and optimizing pose-point constraints. This alternating strategy is summarized in FIG. 7, and can be more efficient and robust compared to a joint optimization strategy. At the beginning of each iteration, the processor 12 is configured to perform a pose-pose graph optimization to correct errors in the camera poses and update the PSM points according to the new poses. The relative motion between the new and old pose of the frame will transform each PSM point for next iteration of optimization. Then, the processor 12 is configured to check the pose-point constraints to remove the outliers constraints before performing the pose-point graph optimization to correct errors in the camera poses, with fixed PSM points. As PSM points are only registered to keyframes, only keyframe poses are updated during this optimization step. Therefore, the processor 12 is configured to update the local chain of intermediate frames adjacent to each keyframe to align the whole camera trajectory, and remove outlier constraints between keyframe poses to reduce the oscillation during alternative optimization. Usually, the optimization will converge quickly within 10 iterations. After the optimization of the camera poses and PSM points converges, the processor 12 is configured to perform a final pose-point graph optimization to correct errors in the PSM points, with fixed camera poses.

Returning to FIG. 3, if a dense mesh construction is requested, the method 100 continues with a step of generating dense mesh using the global PSM (block 170). Particularly, with respect to the embodiments described in detail herein, the processor 12 is configured to execute instructions of the visual SLAM program 60 to, in response to a request for a dense mesh construction, generate a dense mesh using the global PSM 62.

A common task for visual SLAM is to reconstruct the environment, and generate a dense mesh as an output. In conventional dense visual SLAM approaches, the map is represented either in a volumetric form which suffers from limited spatial resolution, or with 3D point cloud or surfels.

If dense mesh reconstruction is requested, the processor 12 is configured to generate a consistent dense mesh by deforming the depth map of each keyframe $K_j$ towards the global PSM 62 and fusing the deformed depth maps together to generate the dense mesh. More particularly, for each keyframe $K_j$, the processor 12 is configured to project the points that have registered pose-point constraints with the keyframe to the 2D image coordinate space. Each projected point $\hat{x}_i$ has a depth value $[g(\mathcal{M}_p^i, \xi)]_z$ and its uncertainty $\sigma_z^i = R\mathcal{M}_{\Sigma_p}^i R^T$ in the respective keyframe $K_j$. Then, for each pixel $x_j$ in the respective keyframe $K_j$, the processor 12 is configured to find a group of projected map points $\hat{x}_i$ by KNN-search in the 2D image space. Given the projected map points, we adjust depth for each pixel according to the equation:

$$\hat{Z}(x_j) = Z(x_j) + \frac{\Sigma_i w_i ([g(\mathcal{M}_p^i, \xi)]_Z - Z(\pi(g(\mathcal{M}_p^i, \xi))))}{\Sigma_i w_i} \quad (19)$$

$$w_i = \exp\left\{-\frac{(\pi^{-1}(x_j, Z(x_j)) - g(\mathcal{M}_{p,\xi}^i))^2}{2R\mathcal{M}_{\Sigma_p}^i R^T}\right\}.$$

Next, the processor 12 fuses the deformed depth maps together to generate the dense mesh. Using this approach, the method 100 is able to produce consistent dense mesh once requested and also save memory and computations during visual SLAM.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for visual simultaneous localization and mapping, the method comprising:
    storing, in a memory, a first data structure having a plurality of surfels representing a 3D environment, each surfel having a 3D position, an uncertainty of the 3D position, an intensity, an uncertainty of the intensity, and a surface normal, the 3D position of each surfel being in a first coordinate space, the plurality of surfels of the first data structure corresponding to a portion of the 3D environment that was visible in a most recent previously identified keyframe image;
    storing, in the memory, a second data structure having a plurality of surfels representing the 3D environment, each surfel having a 3D position, an uncertainty of the 3D position, an intensity, an uncertainty of the intensity, and a surface normal, the 3D position of each surfel being in the first coordinate space, the plurality of surfels of the second data structure corresponding to all portions of the 3D environment that have been visible in any previous keyframe image;
    receiving, with a processor, a first image of the 3D environment from a camera, the first image having an array of pixels, each pixel having an intensity and a depth;
    estimating, with the processor, a first camera pose from which the camera captured the first image based on the first image and the first data structure;
    updating, with the processor, at least one surfel in the plurality of surfels of the first data structure based on the first image and the first camera pose;
    identifying that the first image is a new keyframe image in response to at least one criterion being satisfied; and
    updating, with the processor, in response the first image being identified as the new keyframe, at least one surfel in the plurality of surfels of the second data structure based on at least one corresponding surfel in the plurality of surfels of the first data structure.

2. The method according to claim 1, the estimating the first camera pose further comprising:
    calculating the first camera pose that transforms surfels in the plurality of surfels of the first data structure from the first coordinate space to a coordinate space of the first image with minimal photometric error and geometric error,
    wherein the geometric error is a difference between the 3D positions of respective surfels in the plurality of surfels of the first data structure and the depth values of the array of pixels of the first image at positions corresponding to the 3D positions of the respective surfels transformed into the coordinate space of the first image, and
    wherein the photometric error is a difference between the intensities of the respective surfels in the plurality of surfels of the first data structure and the intensity values of the array of pixels of the first image at positions corresponding to the 3D positions of the respective surfels transformed into the coordinate space of the first image.

3. The method according to claim 2, the calculating the first camera pose further comprising:
    weighting the geometric error with a sensor noise model; and
    weighting the photometric error with a student-t distribution.

4. The method according to claim 2, the calculating the first camera pose further comprising:
    determining the uncertainty of the 3D position of the at least one observation point in the plurality of observation points using a sensor noise model; and
    determining the uncertainty of the intensity of the at least one observation point in the plurality of observation points using a student-t distribution.

5. The method according the claim 1, the updating the at least one surfel in the plurality of surfels of the first data structure further comprising:
    generating at least one observation point by projecting the at least one surfel in the plurality of surfels of the first data structure into a coordinate space of the first image, the at least one observation point having a 3D position, an uncertainty of the 3D position, an intensity, an uncertainty of the intensity, and a surface normal, which are determined based on the intensity values and depth values of neighboring pixels in the array of pixels of the first image; and
    updating the 3D position, the uncertainty of the 3D position, the intensity, and the uncertainty of the intensity of the at least one surfel in the plurality of surfels of the first data structure based on the at least one observation point.

6. The method according to claim 1, wherein the at least one criterion is that less than a predetermined threshold number of surfels in the plurality of surfels of the first data structure are visible in the first image frame.

7. The method according to claim 1, wherein the at least one criterion is that one of (i) an average of the uncertainty of the 3D position of each surfel in the plurality of surfels of the first data structure exceeds a first predetermined threshold, and (ii) an average of the uncertainty of the intensity of each surfel in the plurality of surfels of the first data structure exceeds a second predetermined threshold.

8. The method according to claim 1, the updating the at least one surfel in the plurality of surfels of the second data structure further comprising:
updating the 3D position, the uncertainty of the 3D position, the intensity, and the uncertainty of the intensity of the at least one surfel in the plurality of surfels of the second data structure based on the at least one corresponding surfel in the plurality of surfels of the first data structure.

9. The method according to claim 1 further comprising:
replacing, with the processor, after updating the at least one surfel in the plurality of surfels of the second data structure, the plurality of surfels of the first data structure with a combination of (i) surfels in the plurality of surfels of the second data structure that are visible in the new keyframe image and (ii) new surfels that are visible in the new keyframe image but not included in the plurality of surfel of the second data structure.

10. The method according to claim 9, the replacing the plurality of surfels of the first data structure further comprising:
determining the uncertainty of the 3D position of each new surfel that is visible in the new keyframe image but not included in the plurality of surfel of the second data structure using a sensor noise model; and
determining the uncertainty of the intensity of each new surfel that is visible in the new keyframe image but not included in the plurality of surfel of the second data structure using a student-t distribution.

11. The method according to claim 1 further comprising:
storing, with the processor, in a third data structure (i) a plurality of camera poses corresponding to a plurality of keyframe images and (ii) a first plurality of relative transformations between pairs of camera poses in the plurality of camera poses, the plurality of keyframes images including the identified new keyframe image.

12. The method according to claim 11 further comprising:
adding, with the processor, to the first plurality of relative transformations in the third data structure, a new relative transformation between the camera pose of the identified new keyframe image and a camera pose of a previous keyframe image in the plurality of keyframe images in response to the camera pose of the identified new keyframe image being within a predetermined threshold similarity of the camera pose of the previous keyframe image; and
correcting, with the processor, errors in the plurality of camera poses of the third data structure based on the first plurality of relative transformations, including the added new relative transformation.

13. The method according to claim 11 further comprising:
storing, with the processor, in the third data structure, a second plurality of relative transformations between the first coordinate space and the respective coordinate spaces of the plurality of keyframes images.

14. The method according to claim 13 further comprising:
correcting, with the processor, errors in the plurality of camera poses of the third data structure based on the first plurality of relative transformations and the second plurality of relative transformations; and
correcting, with the processor, errors in the plurality of surfels of the second data structure based on the first plurality of relative transformations and the second plurality of relative transformations.

15. The method according to claim 13 further comprising:
iteratively repeating, with the processor, until values for the plurality of camera poses of the third data structure converge and values for the plurality of surfels of the second data structure converge:
correcting, with the processor, errors in the plurality of camera poses of the third data structure based on the first plurality of relative transformations;
updating, with the processor, the plurality of surfels of the second data structure based on the plurality of camera poses after correcting errors in the plurality of camera poses;
correcting, with the processor, errors in the plurality of camera poses of the third data structure based on the second plurality of relative transformations and the updated plurality of surfels of the second data structure.

16. The method according to claim 15 further comprising:
correcting, with the processor, after the values for the plurality of camera poses of the third data structure converge and the values for the plurality of surfels of the second data structure converge, errors in the plurality of surfels of the second data structure based on the second plurality of relative transformations.

17. The method according to claim 1 further comprising:
generating a dense mesh of the 3D environment by deforming depth values of pixels of each keyframe image in a plurality of keyframe images towards the plurality of surfels of the second data structure and fusing the deformed depth values of pixels of each keyframe image together.

18. A visual simultaneous localization and mapping system, the system comprising:
a camera configured to capture a plurality of images of a 3D environment, each image having an array of pixels, each pixel having an intensity and a depth;
a memory configured to store a first data structure having a plurality of surfels representing the 3D environment, each surfel having a 3D position, an uncertainty of the 3D position, an intensity, an uncertainty of the intensity, and a surface normal, the 3D position of each surfel being in a first coordinate space, the plurality of surfels of the first data structure corresponding to a portion of the 3D environment that was visible in a most recent previously identified keyframe image; and
a processor configured to:
receive a first image of the plurality of images of the 3D environment from the camera;
estimate a first camera pose from which the camera captured the first image based on the first image and the first data structure;
update at least one surfel in the plurality of surfels of the first data structure based on the first image and the first camera pose; and
identifying that the first image is a new keyframe image in response to at least one criterion being satisfied, the at least one criterion including one of (i) an average of the uncertainty of the 3D position of each surfel in the plurality of surfels of the first data structure exceeding a first predetermined threshold, and (ii) an average of the uncertainty of the intensity of each surfel in the plurality of surfels of the first data structure exceeding a second predetermined threshold.

* * * * *

UNITED STATES PATENT AND TRADEMARK OFFICE
CERTIFICATE OF CORRECTION

PATENT NO. : 10,553,026 B2  
APPLICATION NO. : 16/036979  
DATED : February 4, 2020  
INVENTOR(S) : Zhixin Yan et al.

Page 1 of 1

It is certified that error appears in the above-identified patent and that said Letters Patent is hereby corrected as shown below:

On the Title Page

On page 2, in item (56), under the heading "PUBLICATIONS", in Line 4 of the left column "Vistér" should read --Nistér--.

Signed and Sealed this  
Fifth Day of May, 2020

Andrei Iancu  
*Director of the United States Patent and Trademark Office*